United States Patent [19]

Yang et al.

[11] Patent Number: 4,496,514

[45] Date of Patent: Jan. 29, 1985

[54] PROCESS USING SUPERCOOLED LIQUID LACTAM MIXTURES

[75] Inventors: Wei-Yeih W. Yang, Maple Heights; Yoshihisa Okamoto, Sagamore Hills, both of Ohio

[73] Assignee: The B. F. Goodrich Company, Akron, Ohio

[21] Appl. No.: 461,343

[22] Filed: Jan. 27, 1983

[51] Int. Cl.$^3$ ................................................ B29F 1/00
[52] U.S. Cl. .......................... 264/328.6; 264/328.16; 528/315; 528/325
[58] Field of Search ....... 264/328.6, 328.16, DIG. 56, 264/DIG. 83; 528/312, 315, 325

[56] References Cited

U.S. PATENT DOCUMENTS

| | | | |
|---|---|---|---|
| 3,017,391 | 1/1962 | Mottus et al. | 264/DIG. 56 |
| 3,017,392 | 1/1962 | Butler et al. | 264/DIG. 56 |
| 3,234,152 | 2/1966 | Fuller | 528/315 |
| 3,427,289 | 2/1969 | Warner | 528/315 |
| 3,637,608 | 1/1972 | Schaaf et al. | 528/325 |

FOREIGN PATENT DOCUMENTS

| | | | |
|---|---|---|---|
| 624467 | 11/1962 | Belgium | 264/DIG. 56 |
| 1570237 | 7/1973 | Fed. Rep. of Germany | 264/DIG. 56 |

*Primary Examiner*—Donald Czaja
*Assistant Examiner*—V. Fischbach
*Attorney, Agent, or Firm*—George A. Kap; Nestor W. Shust

[57] ABSTRACT

This invention relates to reaction injection molding of a mixture of lactams in presence of a catalyst and a promotor which is carried out by mixing at least two lactams in a liquid state with the catalyst and promoter before injecting the mixture into a preheated mold. The use of a mixture of lactams results in a supercooled mixture which remains liquid at ambient temperature for at least 2 hours.

10 Claims, No Drawings

PROCESS USING SUPERCOOLED LIQUID LACTAM MIXTURES

BACKGROUND OF THE INVENTION

Reaction injection molding (RIM) is a low pressure one-step or one-shot injection of liquid components into a closed mold where rapid polymerization occurs resulting in a molded plastic product. In a RIM process, viscosity of the materials fed to a mold is about 50 to 10,000 cps, preferably about 1500 cps, at injection temperatures varying from room temperature for urethanes to about 150° C. for lactams. Mold temperatures in a RIM process are in the range of about 100° to 200° C. and pressures in the mold are generally in the range of about 50 to 150 psi. At least one component in the RIM formulation is a monomer that is polymerized to a polymer in the mold. In RIM, a chemical reaction takes place in the mold to transform a monomer to a polymeric state. For practical purposes, the chemical reaction must take place rapidly-in less than about 2 minutes for smaller items.

Although urethanes are the only commercial materials currently available for RIM processing, systems based on the use of nylons are being developed due to serious disadvantages of the urethane systems. A significant advantage of the nylon systems over the urethanes resides in the fact that in the nylon systems, there is no need for strictly controlling the mixing ratio of the reactive materials.

Polymerization of a lactam to give a polyamide has been known for many years. The earliest processes for this polymerization were slow, requiring several hours, and involved the use of water or acidic reagents as polymerization catalysts. Subsequent work showed that anhydrous lactams could be polymerized at about 200° C. in the presence of strongly basic materials, particularly the alkali and alkaline earth metals, their hydrides, hydroxides, alkoxides, oxides, alkyls or amides. More recently, it has been disclosed that the base-catalyzed polymerization of a lactam can be accelerated by the addition of certain compounds that function as promoters. Particularly effective promoters which have been disclosed include acylating agents such as acyl halides, anhydrides and the like; isocyanates and compounds containing tertiary nitrogen having at least two of the three substituents on the nitrogen atom consisting of carbonyl, thiocarbonyl, sulfonyl, phosphenyl, thiophosphenyl and nitroso radicals.

Carrying out the RIM process normally involves the metering into a mixing head containing the promoter. The two streams are mixed in the mixing head and then conveyed into a preheated mold where polymerization takes place and where the monomer mixture is converted into a solid object. Such a process, therefore, requires critical metering of two reactive streams and the use of high speed impinging mixing heads which limit the type of fillers that can be admixed in the molding compositions.

A companion patent application entitled "RIM Process Using Single Component Composition" filed on behalf of inventor W. Yang, describes a process whereby a single monomer mixture containing a catalyst and a promoter combination is prepared in a tank. Since this mixture has a long pot life and a short mold time, it can be held in a holding tank and then conveyed directly to a preheated mold without any mixing device between the holding tank and the mold. The monomer mixture contains, inter alia, a lactam monomer or a mixture of such monomers.

The process described above, however, has a number of disadvantages due to its use of the lactam monomers. Since melting points of lactam monomers are substantially above room temperature, they have to be heated above their melting points in order to admix other ingredients. For this reason, all of the process equipment, including all transfer lines, must be heated and maintained at a temperature above the melting point of the lactam monomer to avoid solidification thereof and the consequent plugging of the equipment. Also, heating the lactam monomer to or above its melting point shortens the shelf life of the molding system and thereby lessens the possibility for the system to be processed as one component RIM.

SUMMARY OF THE DISCLOSURE

This invention relates to a RIM process wherein a supercooled mixture of at least two lactams is polymerized in presence of a catalyst and a promoter. The supercooled lactam mixture is liquid at ambient temperature although its solidification point is above the ambient temperature. This property of the lactam mixture provides sufficient time for admixing other ingredients and polymerization at an elevated temperature. The need for heating equipment and transfer lines is thus reduced or eliminated.

DETAILED DESCRIPTION OF THE INVENTION

This invention relates to the use of liquid lactam mixtures in reaction injection molding where a monomer mixture is injected into a preheated mold and polymerized very quickly. Suitable herein are liquid or molten lactam mixtures which remain in a liquid state at ambient temperature sufficiently long to complete the necessary operations in a molding process without solidifying in the transfer lines and the equipment.

Pursuant to the invention disclosed herein, a mixture of lactam monomers is polymerized in presence of a catalyst and a promoter in a preheated mold. The use of a mixture of lactam monomers instead of a single lactam allows for the use of supercooled mixtures which remain liquid for a finite time period before solidifying. Although melting points or solidification points of the lactam mixtures are above ambient or room temperature, the property of supercooling enables these mixtures to remain liquid below their solidification points. This invention also contemplates the use of other components than lactams for the purpose of preparing supercooled lactam mixtures. In this fashion, heat treatment history of the molding mixture is reduced since the mixture need not be reheated or need only be reheated to a substantially lower temperature. Likewise, the equipment need be maintained at a substantially lower temperature.

The class of lactams contemplated herein is defined as follows:

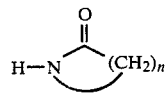

where n is 3 to 14, preferably 5 to 12. Also included herein are substituted lactams containing substituents such as alkyl and alkoxy groups of 1 to 6 carbon atoms, preferably 1 to 2. Specific examples of such lactams include epsilon-caprolactam, alpha-pyrrolidinone, piperidone, valerolactam, capryllactam, lauryllactam, 5-methylcaprolactam, etc. Epsilon-caprolactam is the preferred lactam in admixtures with other lactams. Included herein are unsubstituted and substituted lactams containing substituents on the carbon chain which do not inhibit or otherwise adversely affect polymerization of the lactam mixtures.

It was also discovered that the lactam mixtures can be modified to prepare supercooled mixtures to provide additional time for carrying out various operations while the mixture remains liquid below its solidification point. The modification involves the admixture of a material that is a low molecular weight liquid material, preferably with a molecular weight of about 50 to 5000. It appears that this material polymerizes with the lactams and does not noticeably degrade physical properties that were tested. The following materials offer the desired results: butanediol, polytetrahydrofuran with a molecular weight of 2000 (Polymeg ® 2000), polybutadiene diol with a molecular weight of about 2000, Kelpoxy ® resin prepared by reacting an epoxy resin with carboxyl-terminated butadiene-acrylonitrile reactive liquid polymer, and Hycar ® RLP ATBN which is an amine-terminated butadiene-acrylonitrile reactive liquid polymer. Amount of the materials that had been tried varied from about 5 to 10 parts by weight per 100 parts by weight of lactam monomers and produced substantial melting point depression. Amount of the materials can be varied widely, however, for any particular situation and it appears that substantial improvement can be obtained by adding as little as about 1 part, preferably at least 2 parts by weight per 100 weight parts of lactam monomers. The upper limit of the materials is dictated by practical considerations, such as its effect on physical properties.

The anionic polymerization catalyst is used in an amount of a fraction of one percent, such as 0.1 and up to about 10 mole percent, preferably about 1 mole percent. The catalyst can be selected from the class of compounds commonly recognized as suitable basic catalysts for the anhydrous polymerization of lactams, especially the Grignard reagents. In general, all alkali or alkaline earth metals are effective catalysts either in the metallic form or in the form of hydrides, halohydrides, alkylhalides, oxides, hydroxides, carbonates and the like. Especially useful are organometallic compounds of the metals mentioned above such as metal alkyls, metal phenyls, metal amides and the like. Specific examples include sodium hydride, potassium hydroxide, lithium oxide, ethyl magnesium bromide, phenyl magnesium bromide, calcium fluorohydride, strontium carbonate, barium hydroxide, methyl sodium, butyl lithium, potassium phenyl, diphenyl barium, sodium amide and magnesium diethyl. All of the foregoing compounds react with the lactam monomer to form the metal lactam, which is the active catalytic agent in the lactam polymerization mechanism. The metal lactam catalyst can, therefore, be formed in situ by reaction of one of the foregoing metal or metal compounds with lactam monomer in the polymerization medium or by prior reaction of the metal or metal compound.

The promoters suitable for lactam polymerization are selected from compounds defined as follows:

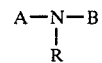

where N is a tertiary nitrogen atom, i.e., devoid of any hydrogen atom attached thereto; A is an acyl radical selected from

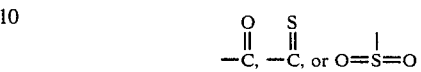

B is an acyl radical selected from

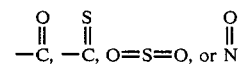

and R can be of the same or of general type as A or B, or a hydrocarbon radical such as aryl, alkyl, aralkyl, alkaryl, cycloalkyl, etc., or a heterocyclic radical such as pyridyl, quinolyl, etc., or any of the aforementioned groups substituted with or containing additional radicals or groups such as carbonyl, N-substituted carbonyl, alkoxy, ether, sulfonyl, tertiary amino, etc., or any other non-interfering group which will not preferentially react with the lactam or which will not otherwise affect activity of the catalyst. At least two acyl groups must be attached to the tertiary nitrogen atom in order to activate at least one of the nitrogen-acyl group bonds sufficiently to break under the prevailing polymerization conditions. Radicals A and B can be attached together to form a ring system. Likewise, radical A and the tertiary nitrogen atom can constitute a part of a ring system not including radical B.

A preferred class of promoters having the aforesaid structure are the N-substituted imides that have at least two acyl groups attached directly to the tertiary nitrogen atom such as bis-acyllactams, N-substituted imides comprising cyclic imides of dicarboxylic acids, and N-substituted imides that have a multiplicity of the essential N,N-diacyl tertiary nitrogen atom groups. Another class of promoters are the N-acyl sulfonamides that are devoid of hydrogen atoms on the sulfonamide nitrogen atom, as well as disulfonamides, N-nitrosoamides, and N-nitrososulfonamides.

Specific examples of the promoters generally defined in the preceding paragraphs include terephthaloyl bis-caprolactam, caprolactam capped methylene diisocyanate, N-acetyl-2-pyrrolidone, N-acetyl-epsilon caprolactam, N-benzoyl-epsilon caprolactam, N-propionyl-ω-caprylolactam, N-phenylsuccinimide, N-benzoylphthalimide, N,N',N''-trimethylester of isocyanuric acid, ethylene disuccinimide, N,N-diacetylmethylamine, N-acetyl-N-ethyl-p-toluenesulfonamide, N-methylsaccharin, N,N-di(p-toluenesulfonyl)aniline, N-nitroso-2-pyrrolidone, N-nitrososuccinimide, N,N-diacetylnitrosamine, and N-nitroso-N-methylbenzenesulfonamide. U.S. Pat. No. 3,017,391 to Mottus, et al. discloses the above-mentioned promoters in greater detail.

A combination of promoters can be used in order to adjust pot life and mold time, in actual operation. In this embodiment, a first promoter with a short pot life and a short mold time is used in conjunction with a second promoter with a long pot life and a long mold time in a lactam polymerization reaction. Although these promoters are generally described above, the first promoter also is devoid of an amide hydrogen and is characterized by the presence of a tertiary nitrogen whereas the second promoter contains an amido hydrogen and is characterized by the presence of a secondary nitrogen connected to an aromatic moiety. Such a combination of promoters can impart a pot life of at least one-half hour, preferably at least one hour at 80° C. and a mold time of less than 2 minutes, preferably less than 1 minute at 155°.

It should be understood that other materials can be added to the composition to improve properties thereof. Examples of such materials include fillers, pigments, stabilizers, and the like.

The reaction injection molding process for making solid objects involves mixing the lactam monomers with a catalyst, a promoter, and any other desirable ingredients. The lactam mixture used is heated above its melting temperature to render it liquid. The mold is generally maintained at about 100° to 200° C., preferably at about 120° to 160° C. When the monomer formulation is conveyed into the preheated mold, the polymeriation system is thermally activated and polymerization proceeds very quickly to the point where a solid object is obtained in less than 2 minutes, preferably in less than 1 minute. After curing, a solid, molded object is removed. In the mold, polymerization of the lactam takes place and the system changes from a liquid to a gel and then undergoes a color change from clear to opaque, indicating solidification. Viscosity of the liquid mixture before injecting it into the mold is generally in the range of about 50 to 20,000 cps, preferably about 1500 cps, measured at 70° C.

Melting point of $C_6$ lactam, i.e., caprolactam, is 69°–71° C., that of $C_8$ lactam is 77°–79° C., and that of $C_{12}$ lactam is 153° C. Pursuant to this invention, it is possible to use supercooled liquid mixtures of lactams at ambient temperature of about 20° C. for carrying out mixing and other operations. For instance, a mixture of 42.5 weight parts at $C_6$ lactam, 42.5 parts $C_8$ lactam, and 15 parts $C_{12}$ lactam yields a lactam mixture having a solidification point of about 41° C. Although a substantial reduction in the melting point of the mixture was affected relative to the lactam with the highest melting point, of greater significance is the time of 5 hours that it takes to solidify standing at room temperature. This amount of time is sufficient to mix other ingredients with the lactam mixture and inject it into a preheated mold. Suitability of a lactam mixture can be determined by measuring the time it takes for the molten lactam mixture to solidify while standing at room temperature. If the cooling period during which the lactam mixture remains in a liquid state is at least 2 hours, preferably on the order of about 3 to 4 hours or longer, the particular lactam mixture is considered suitable since it would provide sufficient time, without additional heat, to carry out the necessary operations.

The following examples will serve to further illustrate the practice of the present invention and the benefits derived therefrom.

EXAMPLE 1 to 18

These examples demonstrate preparation of molten lactam mixtures with and without an admixing component and the measurement of the time it took for the samples to solidify at room temperature of about 20° C.

A large number of samples were prepared by mixing various lactams and other materials. These samples were then heated until all materials in the samples liquified following which, the molten samples were allowed to cool at room temperature and the time required for solidification at room temperature was recorded. Results of the experiments are set forth in Table I, below, where amounts are given in weight parts:

TABLE I

| Sample No. | Lactam 6 | Lactam 8 | Lactam 12 | Admixing Component | S.P. °C. | Time |
|---|---|---|---|---|---|---|
| 1. | 50 | 50 | 0 | — | 42 | 5 hrs. |
| 2. | 40 | 40 | 20 | — | 45 | VS |
| 3. | 30 | 30 | 40 | — | 40 | VS |
| 4. | 50 | 20 | 30 | — | 42 | VS |
| 5. | 20 | 50 | 30 | — | 50 | VS |
| 6. | 70 | 10 | 20 | — | 54 | VS |
| 7. | 70 | 20 | 10 | — | 51 | VS |
| 8. | 20 | 70 | 10 | — | 47 | VS |
| 9. | 50 | 40 | 10 | — | 50 | VS |
| 10. | 42.5 | 42.5 | 15 | — | 41 | 5 hrs. |
| 11. | 60 | 30 | 10 | — | 53 | VS |
| 12. | 50 | 40 | 10 | 5-butanediol | 12 tg | 3 hrs. |
| 13. | 42.5 | 15 | 42.5 | 5-butanediol | 4 tg | 1 week |
| 14. | 85 | 85 | 30 | 13-Polymeg 2000 | 24 tg | 4 hrs. |
| 15. | 100 | 100 | 0 | 20-Kelpoxy | 39 | 4 days |
| 16. | 100 | 100 | 0 | 20-Polybutadiene-diol | −64 tg | 48 hrs. |
| 17. | 100 | 100 | 0 | 20 ATBN | −64 tg | 12 hrs. |
| 18. | 50 | 50 | 10 | 41 | — | 9 hrs. |

In the above table, mixtures of $C_6$, $C_8$ and $C_{12}$ lactams were prepared and tested, as described. The time column indicates time to solidification at room temperature. The designation "VS" stands for very short and generally indicates a time period of less than about 2 hours, "S.P." stands for solidification point, and tg represents the glass transition temperature.

As is evident from Table I, sample #1 was a mixture of 50 parts by weight of $C_6$ lactam and 50 parts by weight of $C_8$ lactam. It took sample #1 5 hours to solidify while standing at room temperature. Table I also shows that solidification point of sample #1 was 42° C., indicating a supercooled condition at room temperature while in the liquid state. Sample #2, which was a mixture of 40 parts $C_6$ lactam, 40 parts $C_8$ lactam, and 20 parts of $C_{12}$ lactam, solidified quickly upon cooling. Same was true of samples #3 to #8. Sample #9 had a cooling time to solidification of 3 hours and represents a borderline case whereas sample #10, with a cooling time of 5 hours, is a suitable mixture, based on the criterion defined herein.

Addition of an admixing component, in some instances, produced startling results. Sample #12 corresponds to sample #9 in lactam composition, however, sample #12 also contained 5 parts by weight of butanediol. Whereas solidification of molten sample #9 at room temperature was very rapid, sample #12 required 3 hours and sample #13 required about 1 week. Table I shows that solidification of samples #12 and #13 took place at 12° C. and 4° C., respectively, these temperatures indicating glass transition points for the respective compositions. Samples #14 to #17 demonstrate the successful use of other admixing components. The ATBN in sample #17 is ATBN 1300X16 which has acrylonitrile content of 16.5%, viscosity at 27° C. of 235,000 CP, and total amine equivalent weight of 800 to 1000.

Certain of the tests in Table I were repeated and it was found that the time to solidification was longer than indicated in Table I.

EXAMPLE 19

This example demonstrates conventional polymerization of a lactam mixture.

The lactam mixture contained 35 g of $C_6$ lactam and 35 g of $C_8$ lactam. To this mixture was added 7.0 g of Kelpoxy ® epoxy resin as an admixing component. When the mixture was heated to liquifaction, it took 4 days for it to solidify standing at room temperature of about 20° C. While the lactam mixture was still in the liquid state, 2.65 ml of phenyl magnesium bromide catalyst was added which was followed by addition of 3.0 g of a 1:1 mole ratio mixture of caprolactam capped diphenylmethane diisocyanate and terephthaloyl bis-acyl caprolactam, as promoters. The resulting molding composition was charged into a mold preheated to 160° C. whereupon the composition solidified in 14 seconds. The molded object was kept in the mold for 20 minutes, when it cooled to 70° C. Upon removal from the mold, the molded object was soft but quickly stiffened. Its Izod impact strength was 7.4, specific gravity of 1.078, and flexural modulus of 36,000.

We claim:

1. A process comprising the steps of preparing a polymerization mixture by mixing a lactam polymerization catalyst, a promoter, and a separate supercooled mixture of at least two lactams that remains in a liquid state at ambient temperature; introducing said mixture into a mold maintained at an elevated temperature at which polymerization of said lactams is carried out quickly; and extracting a molded object from the mold.

2. Process of claim 1 wherein said lactams are defined as follows:

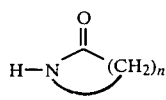

where n is 3 to 14, wherein said catalyst is a basic catalyst used in anhydrous polymerization of lactams, and wherein said liquid lactam mixture remains liquid at ambient temperature for at least 2 hours.

3. Process of claim 2 wherein said promoter is a combination of a first promoter that alone provides short pot life and short mold time and a second promoter that alone provides long pot life and long mold time, the combination of said first and said second promoters imparts to said mixture a long pot life and a short mold time.

4. Process of claim 3 wherein n is 5 to 12 and polymerization in the mold is carried out in less than about 2 minutes at a temperature in the range of 100° to 200° C. to a point where said mixture solidifies.

5. Process of claim 4 wherein said first promoter is devoid of an amido hydrogen and is characterized by the presence of a tertiary nitrogen whereas said second promoter contains an amido nitrogen and is characterized by the presence of a secondary nitrogen connected to an aromatic moiety.

6. Process of claim 2 wherein said liquid lactam mixture is in a supercooled condition at room temperature and can remain liquid at room temperature at least 2 hours.

7. Process of claim 2 wherein said liquid lactam mixture is supercooled at room temperature and can remain liquid at room temperature for at least 3 to 4 hours.

8. Process of claim 6 wherein said mixture has a pot life of at least one-half hour at 80° C. and a mold time of less than 2 minutes at 155° C.

9. Process of claim 6 wherein said liquid lactam mixture includes an effective amount of an admixing component to prolong the time period during which said liquid lactam mixture remains liquid at room temperature, said admixing component is selected from butanediol, polytetrayhydrofuran, polybutadienediol, and amine terminated butadiene-acrylonitrile reactive liquid polymers.

10. Process of claim 7 wherein said liquid lactam mixture includes an effective amount of an admixing component to prolong the time period during which said liquid lactam mixture remains liquid at room temperature, said admixing component is selected from butanediol, polytetrahydrofuran, polybutadienediol, and amine terminated butadiene-acrylonitrile reactive liquid polymers.

* * * * *